Aug. 25, 1959 H. R. WEED 2,901,695
TESTING DEVICE FOR ELECTRICAL WINDINGS AND THE LIKE
Filed July 2, 1954 2 Sheets-Sheet 2

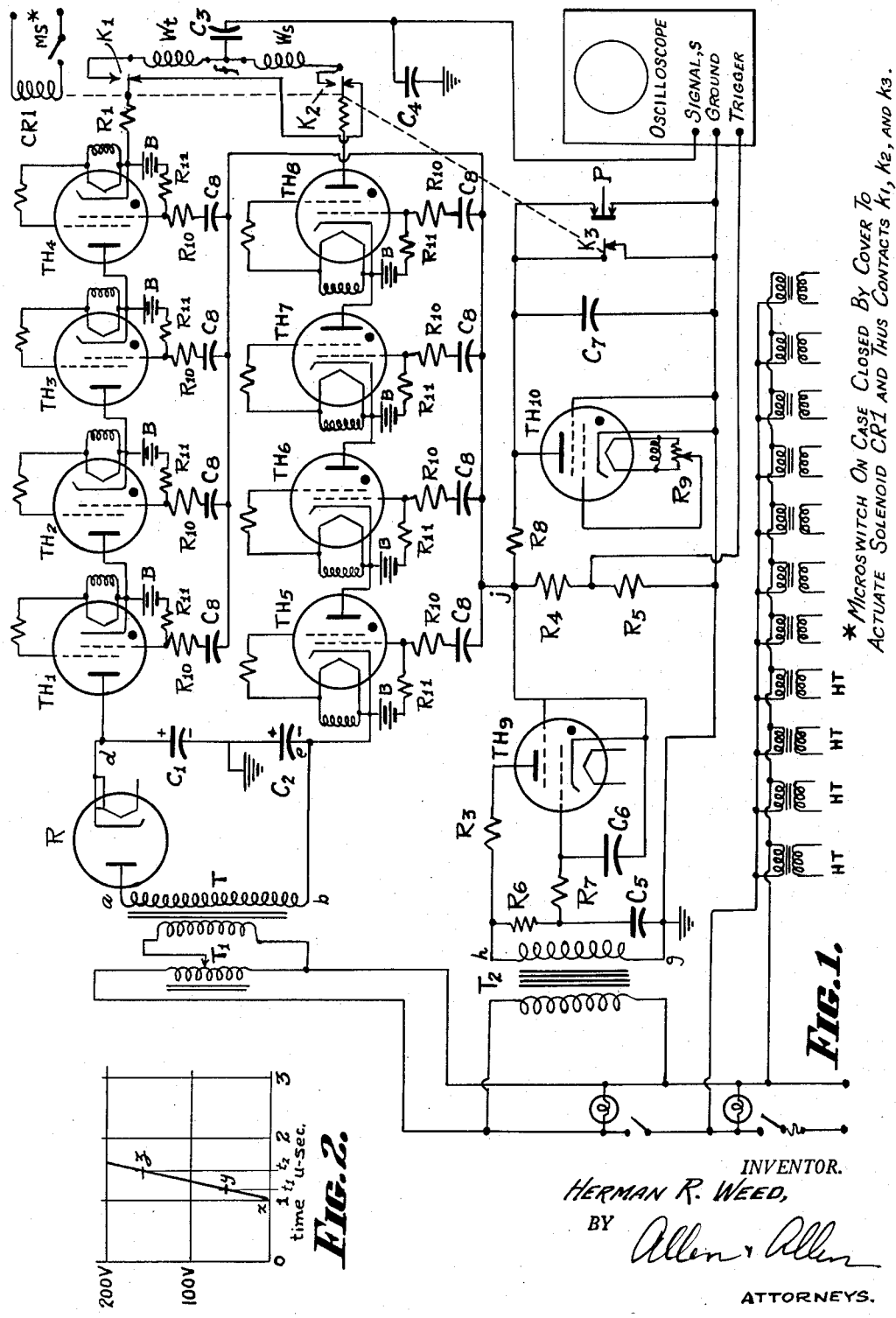

NORMAL PICTURE
BRUSH ON BAR

NORMAL PICTURE
BRUSH BETWEEN BARS

WRONG N° TURNS

APPLIED PULSE

OPEN, NOT ARCING

OPEN, ARCING

SHORTED TURNS

GROUND

INVENTOR.
HERMAN R. WEED,
BY *Allen & Allen*
ATTORNEYS.

United States Patent Office 2,901,695
Patented Aug. 25, 1959

2,901,695

TESTING DEVICE FOR ELECTRICAL WINDINGS AND THE LIKE

Herman R. Weed, Worthington, Ohio, assignor to Robbins & Myers, Inc., Springfield, Ohio, a corporation of Ohio Application July 2, 1954, Serial No. 441,058

10 Claims. (Cl. 324—57)

This invention relates to a testing device for electrical windings and the like and more particularly to an electronic device for applying to a coil or winding to be tested a surge voltage, while at the same time applying a like surge voltage to a standard coil or winding and observing the instantaneous differences of the potentials across the two windings on a synchronized oscilloscope.

The surge voltage generator operates on the principle of repetitive discharging of a charged capacitor into the coil or winding to be tested. Thus, the initial magnitude of the surge voltage and the energy which must be dissipated in the coil under test are determined exactly by the size of the capacitor and the charge on its plates.

When this surge voltage is applied to a winding to be tested, the time variation of voltage across the coil to be tested depends upon its exact electrical properties including the number and direction of turns, the insulation of each point on the coil to ground and to every other point on the coil, the connections of the winding parts to the commutator, if the winding be an armature, the wire size, series and parallel paths, and in effect every possible factor which contributes to the electrical characteristics of the winding. The electrical behavior of the coil or winding, when subjected to the surge voltage, indicates in a combined result the effect of all these factors, and any deviation in the coil or winding characteristics will produce a change of some sort in its electrical behavior. If the behavior of the winding can be observed, as for example on an oscilloscope screen, such deviations would be detectable.

However, the deviations are difficult and often impossible to detect because of their small size as compared to the normal pattern of voltage or current variation. By the use of the principle of null detection or difference measurement which emphasizes deviations from the normal patterns and suppresses those pattern components which are due to normal and desired electrical properties, the deviations can be more readily observed. When identical surge voltages are thus applied to a standard coil or winding having desired qualities, and to a coil or winding under test, the instantaneous difference of the potentials across the two windings is observed on a synchronized oscilloscope and if there is a deviation in the electrical properties of the coil under test, a recognizable difference pattern of a particular shape will be produced.

With the foregoing considerations in mind, it is an object of the present invention to provide a testing device for testing various electrical properties of a coil or winding. It is another object of the invention to provide a device by means of which the electrical behavior of a coil or winding to be tested may be compared with the electrical behavior of a standard coil or winding in such a manner that a characteristic pattern will appear on an oscilloscope screen, from which pattern the characteristics and qualities of the coil under test may be determined.

It is another object of the invention to provide an electronic apparatus for applying sudden surge voltages to a standard coil and coils under test and to apply a signal dependent upon the difference between potentials across the two coils to the input of an oscilloscope.

Still another object of the invention involves the provision of a trigger circuit to control the application of the surge voltage above referred to and also to trigger the sweep of the oscilloscope.

Still another object involves the provision of an apparatus as above outlined which will be simple and safe in operation and inexpensive in construction and maintenance.

These and other objects of the invention which will be pointed out in greater detail hereinafter or which will be apparent to one skilled in the art upon reading these specifications, are accomplished by that certain construction and arrangement of parts and by that series of method steps of which an exemplary embodiment will now be described.

Reference is made to the drawings forming a part hereof and in which:

Figure 1 is a general wiring diagram of the apparatus.

Figure 2 is a graph showing voltage plotted against time in microseconds to show the relationship between the triggering apparatus, the oscilloscope sweep and the test circuit.

Figure 3:
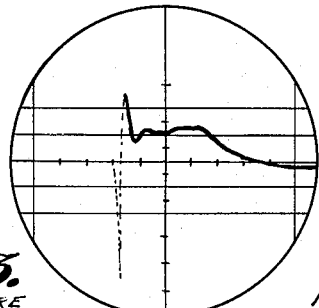

Figures 3 to 10 inclusive show the appearance of the oscilloscope screen under various conditions to indicate the difference patterns which may be found.

As outlined above, a supply voltage is applied through a rectifier tube to two discharge capacitors in series. Means are provided to adjust the primary voltage of the supply transformer so that the capacitors may be charged to any predetermined peak voltage, say from 200 to 2,000 volts. The common point between the discharge capacitors is grounded and from one capacitor a discharge path leads to a standard coil and from the other capacitor a duplicate discharge path leads to the coil to be tested, and the common point between the two coils is connected to the input of an oscilloscope by means of a capacitor divider to ground. A separate trigger circuit is provided to trigger the discharge of the discharge capacitors as well as the sweep of the oscilloscope. The two identical surges of voltage applied to the coils are of opposite polarity with respect to ground so that, the two windings being in series, the potentials of their common point with respect to ground may be observed. The two surges are simultaneously applied to the two coils with a maximum potential difference of up to 4,000 volts accomplished by two sets of triggered thyratrons.

The two discharge capacitors are recharged once each cycle from a 60-cycle per second supply and the triggering of the thyratrons is carefully synchronized with the 60-cycle source so that electrical connection to the supply line is impossible during the surge application. A trigger is also provided to excite the single shot trigger sweep circuit of the oscilloscope.

Referring now in more detail to the drawings, the supply transformer for the discharge capacitors is indicated at T. The primary voltage of the transformer T may be adjusted by means of a continuously variable transformer indicated at $T_1$, the transformer $T_1$ being connected to a commercial 60-cycle supply. The charge on the capacitors to produce any predetermined peak voltage may be determined by adjustment of the transformer $T_1$.

The secondary of the transformer T is connected to the two discharge capacitors $C_1$ and $C_2$ and the rectifier tube R all in series. With the tube R in series, the capacitors $C_1$ and $C_2$ will be charged to the maximum value of the supply voltage across the terminals $ba$ each time the point $a$ is positive with respect to the point $b$. The rectifier tube R will not permit the discharge capacitors $C_1$ and $C_2$ to discharge through the source nor will it connect them across the line $ab$ again until they have been discharged into the test coils. The common point of the capacitors $C_1$ and $C_2$ is grounded as shown, and it is the potential of the points $d$ and $e$ with respect to ground that will institute the surge voltage. It should be noted that the point $d$ is positive with respect to ground while the point $e$ is negative with respect to ground. It is essential that the capacitors $C_1$ and $C_2$ be as nearly identical as possible.

The discharge path into the test coil or winding $W_t$ is through the tubes $TH_1$, $TH_2$, $TH_3$ and $TH_4$. Similarly, the discharge path into the standard coil or winding $W_s$ is through the tubes $TH_5$, $TH_6$, $TH_7$ and $TH_8$. It will be observed that the direction of the tubes $TH_5$ through $TH_8$ in the circuit is opposite to that of the tubes $TH_1$ through $TH_4$, since the polarity of voltage on the capacitor $C_2$ is opposite to that on the capacitor $C_1$ as far as the discharge tubes are concerned.

The number of tubes is not important to the operation of the circuit except for the requirement that they must have the required forward breakdown voltage of up to 2,000 volts as a group or whatever maximum value is chosen, their ironization time must be short (preferably about 0.5 microsecond), they must be capable of withstanding repetitive current surges of the value as determined by the circuit, and their replacement cost should be low. Various single, double and multiple tubes meet these specifications. The tubes here described are 2050 thyratrons because they are very low in replacement cost and are much more readily available than other tubes. Between the bank of tubes $TH_1$ to $TH_4$ and the test coil $W_t$ there is provided a resistor $R_1$ to limit the current to protect the thyratrons $TH_1$ to $TH_4$ from overrated surges in the case of ground faults or other low impedance failures of the test coil $W_t$.

The common point between the coils $W_t$ and $W_s$ is indicated at $f$ and it is the variation in potential of the point $f$ with respect to ground which is observed by the oscilloscope (not shown). Since this voltage is of considerable magnitude, a capacitor divider comprising the capacitors $C_3$ and $C_4$ is used between the point $f$ and ground to supply the oscilloscope input $s$.

The control of the circuit as outlined to this point is of the greatest importance. The tubes $TH_1$ through $TH_8$ must fire as nearly simultaneously as possible. This requires a large grid firing voltage having a very steep wave front and having a relatively low impedance since it must fire all eight tubes $TH_1$ to $TH_8$ in parallel as far as the grids are concerned.

The firing pulse is produced by the tubes $TH_9$ and $TH_{10}$ with their associated circuit components. The tubes $TH^9$ and $TH_{10}$ may conveniently be thyratrons identical to those used for tubes $TH_1$ through $TH_8$. Such thyratrons make the tube replacement problem less difficult and also produce the required low impedance and high power pulse.

The supply transformer $T_2$ for the trigger circuit is an isolation transformer as well as a step-up transformer, so that the set may be operated independently of the A.C. supply line ground. The first possible conduction path for the tube $TH_9$ is through the transformer terminals $g$ and $h$, the resistor $R_3$, the tube $TH_9$, the resistor $R_4$ and the resistor $R_5$. The point at which the tube $TH_9$ fires is controlled and determined by two factors. In the first place, the voltage across the terminals $gh$ is 180° out of phase with the voltage across the terminals $ba$. Therefore, the tube $TH_9$ cannot conduct at the same time as the tube R. By this means, the capacitors $C_1$ and $C_2$ cannot discharge during a period when there is any possibility of the transformer T conducting through the tube R and hence it is impossible to connect line voltage to the test coils through the tubes $TH_1$ through $TH_8$.

In the second place, the exact point at which the tube $TH_9$ fires in the half cycle during which $gh$ is positive, is controlled by a phase shifting circuit made up of the resistors $R_6$ and $R_7$ and the capacitors $C_5$ and $C_6$. This phase shifting circuit is adjusted to approximately 90° behind $gh$ so as to give maximum protection against line conduction during discharge as discussed above and to provide a maximum trigger pulse.

Until the tube $TH_9$ conducts, the voltage across the resistors $R_4$ and $R_5$ is zero. When the tube $TH_9$ fires, this voltage suddenly rises to approximately two-thirds of 310 volts or about 200 volts. Since the circuit is substantially pure resistance, the rise time of the voltage is limited primarily by the ionization time of the tube $TH_9$ which is about 0.5 microseond. This sudden rise of the potential of the point $j$ with respect to ground constitutes the steep wave front of voltage which used to fire the tubes $TH_1$ through $TH_8$. That portion of this voltage appearing across the resistor $R_5$ is used to trigger the single shot triggered sweep of the oscilloscope. The scope must be sensitive to trigger voltages which are positive with respect to ground and it must have sufficient trigger gain to start the sweep as the trigger voltage rises before the tubes $TH_1$ through $TH_8$ trigger. This gives the sweep circuit a lead of about 0.25 microsecond on the discharge or, in other words, it provides the needed signal delay to obtain a complete visual picture on the screen. This situation is graphically depicted in Figure 2 where the point $x$ indicates the firing of tube $TH_9$, the point $y$ indicates the start of the oscilloscope sweep and the point $z$ indicates the point at which the tubes $TH_1$ through $TH_8$ start to conduct. This signal delay may also be accomplished by the use of another tube with a separately controlled firing point thereby supplying two separate signals for triggering the oscilloscope and the discharge tubes.

The tube $TH_{10}$ is used to terminate the voltage surge across the point $j$ to ground and provide a short circuit path in parallel with resistors $R_4$ and $R_5$ through the small resistor $R_8$. The firing point of the tube $TH_{10}$ is controlled by several factors. In the first place, its plate voltage is derived from the voltage across the resistors $R_4$ and $R_5$ and it therefore cannot fire until after the tube $TH_9$ has fired. In the second place, the combination of the small resistor $R_8$ and the capacitor $C_7$ delay the building up of this plate voltage for about 0.5 miscrosecond. (If this delay is not provided, the tube is likely to fire erratically because of the sudden application of plate voltage unless a rather elaborate grid circuit is used.) Further, the firing point is controlled by applying a portion of its heater voltage to the control grid. Adjustment of the resistor $R_9$ makes it possible to delay the firing of the tube $TH_{10}$ to the point that it will not conduct at all so that the width of the pulse across the resistors $R_4$ and $R_5$ may be adjusted from near zero to $\pi/2$ radians.

The device as a whole is enclosed in a box or case having a door or cover. A microswitch MS is associated with the cover or lid so that the switch MS is closed when the case or box is closed. The switch MS is in a circuit of a control relay $CR_1$. It will be observed that in the discharge path to the coilts $W_t$ and $W_s$ there are the contacts $K_1$ and $K_2$. When the case is open and the microswitch MS is open, the relay $CR_1$ is deenergized and the contacts at $K_1$ and $K_2$ are open so that the discharge circuit is shorted. When the case is closed, the switch MS is closed energizing the relay $CR_1$ which closes the contacts at $K_1$ and $K_2$. The relay $CR_1$ also operates the contact at $K_3$ in the trigger circuit, the contact at $K_3$ being normally closed to short circuit the triggering pulses and the contact $K_3$ is opened by the relay $CR_1$ when it is energized as above outlined. In parallel with the contact $K_3$ there is a normally closed push-button switch P which also short circuits the triggering pulse so that the tubes $TH_1$ through $TH_8$ cannot fire unless the switch P is manually depressed or opened.

The grids of the tubes $TH_1$ through $TH_8$ are capacity coupled to the triggering pulse with a 10,000 ohm current limiting resistor in series with each. These resistors are indicated at $R_{10}$. In order to maintain the possible maximum of 500 volts forward on each tube during and immediately after the capacitors $C_1$ and $C_2$ are charged, a 45 volt negative bias is placed in each grid circuit and a negatively phased A.C. voltage is applied to their shield grids from their individual heater supplies. The 45 volt negative bias in each case is provided by a battery B.

The balance between the size of the series 10,000 ohm resistor $R_{10}$, the 45 volt battery B and the 33,000 ohm resistor $R_{11}$ is rather critical, since while the capacitors $C_1$ and $C_2$ are charging a positive grid voltage will be developed across the resistor $R_{11}$ because of the charging of the capacitor $C_8$. This must be opposed by the battery. For this time it would be preferable if the value of $R_{11}$ were zero but when the firing pulse is applied it is divided between the resistors $R_{10}$ and $R_{11}$ and it would be preferable if $R_{10}$ were zero and $R_{11}$ were large.

All the heater transformers are separate since they must operate with their secondaries at different potentials to ground and their secondaries must have particular phase relations with respect to the supply. The heater transformers are indicated at HT. The oscilloscope used should have a minimum writing rate of 1 centimeter per microsecond since the discharge transient lasts for about 50 microseconds. It should also have a single shot trigger sweep sensitive to positive pulses.

In its actual operation, the circuit above described deviates slightly from its theoretical explanation. The tubes $TH_5$ through $TH_8$ actually fire slightly before the tubes $TH_1$ through $TH_4$. This is probably because of the fact that the tube $TH_5$ is the only one of the tubes $TH_1$ through $TH_8$ whose cathode is at a definite fixed potential with respect to ground. It will be observed that the cathode of the tube $TH_5$ is tied to the point $e$ and because of the size of the capacitor $C_2$ it is not affected appreciably by other circuit conditions. All of the other tubes have their cathodes floating and must depend upon stray capacity of the wires and transformers to keep their voltages fixed.

Thus, with the tubes $TH_5$ firing slightly before others, its firing increases the plate voltages on the tubes $TH_6$ through $TH_8$ and the capacitor $C_2$ therefore starts its discharge slightly before the tubes $TH_1$ through $TH_4$ conduct. This momentarily drives the point $f$ negative and the oscilloscope shows a negative or downward peak. Perhaps a microsecond later tubes $TH_1$ through $TH_4$ fire and bring the potential of the point $f$ back toward zero. This slight time difference results in a particular voltage fluctuation of the point $f$ that becomes known as the reference pattern to the operator. Such a pattern has the advantage of giving a distinction between normal test results and a failure in the operation of the circuit which would reesult in an absolute null of zero. It is believed that this is a correct explanation because it has been found that the time difference between the two surges varies slightly with the magnitude of the surge voltage and hence the more nearly fixed potential of the point $e$. Observation has also disclosed that this time difference will give different results when the test coil and standard coil $W_t$ and $W_s$ are interchanged. As shown in Figure 1, the test coil $W_t$ receives the second or positive surge and this provides a pattern which is best suited for interpretation. It is in this position that the wave of the applied pulse across the test coil $W_t$ is of the best form with a rise time of about 0.5 microsecond. As can be determined from a consideration of Figure 3 in which the horizontal graduations represent about 10 microseconds, the duration is roughly 35 microseconds.

Figure 4:
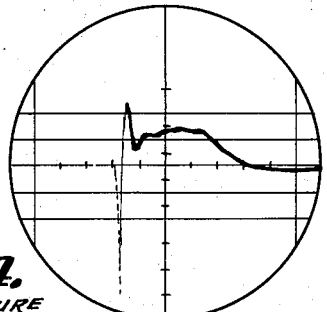

Although the pattern observed on the oscilloscope depends upon the type of coil or winding under test and to some extent on the magnitude of the voltage applied, a typical set of curves for an armature under test is shown in Figures 3 to 10 inclusive. The pattern will be observed to change as the armature is rotated. Figure 3 shows a typical normal picture with the brush on the commutator bar while Figure 4 represents a typical picture of a normal armature with the brush between bars.

Figure 5:
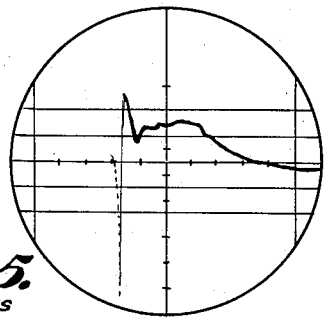
Figure 6:
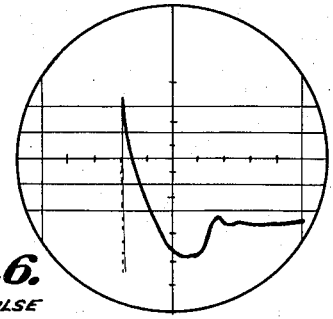
Figure 7:
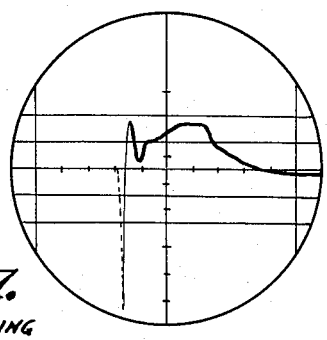
Figure 8:
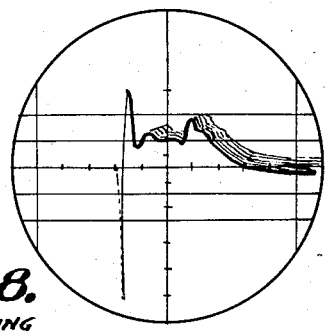
Figure 9:
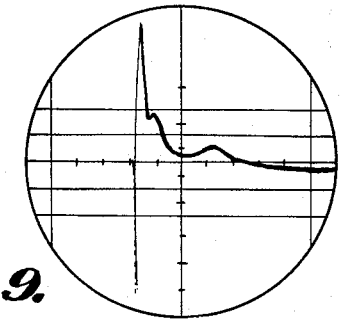
Figure 10:
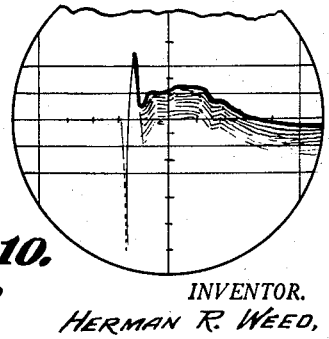

The differences in the pattern for the various faults are easily noticed and can readily be distinguished from a normal picture by a relatively untrained operator and in most cases the operator can determine the type and location of the fault. In Figure 5 there is shown a typical picture when the armature has the wrong number of turns. Figure 6 shows a typical picture of the total applied surge to the test winding as observed across $W_t$. Figure 7 shows a typical picture with an open connection and no arcing while Figure 8 shows a similar fault but with arcing. Figure 9 shows the situation when turns are shorted and Figure 10 shows the situation when there is a ground.

The relation between the pattern change and the location of the fault is dependent upon the type of fault. Thus, for example, a ground is most noticeable when nearest the brush making contact with the resistor $R_1$ and it is least noticeable at the point $f$. On the other hand, a short between turns is least noticeable when near a brush since the brush shorts adjacent commutator bars during normal rotation. In other words, the picture on the screen rises and falls twice during one revolution of the armature from a normal indication to a "short" indication. The sensitivity of the apparatus can be adjusted by having the brushes separated by amounts differing from 180° depending somewhat on the type of winding under test.

While I have described the circuit and the apparatus in considerable detail, it will be understood that certain modifications may be made without departing from the spirit of the invention and I therefore do not intend to limit myself otherwise than as set forth in the claims which follow.

Having now fully described my invention, what I claim as new and desire to secure by Letters Patent is:

1. A testing device for electrical windings comprising a pair of substantially identical discharge capacitors and a rectifier in series, a ground connection between said capacitors, means for charging said capacitors through said rectifier, a discharge path for one of said capacitors into a standard winding, a discharge path for the other capacitor into a winding to be tested which is connected in series opposition with the standard winding, each of said paths comprising at least one electronic tube having a control grid, the plates and cathodes of the tubes in the respective discharge paths being reversely connected relative to the two windings, an oscilloscope having one input terminal grounded and having its other input terminal connected to a common point between said standard winding and said winding to be tested, a trigger circuit including at least one electronic tube and associated passive components producing a steep wave front voltage pulse, resistance-capacitance coupling means connecting said voltage pulse to the said control grids to synchronize the firing of said electronic tubes in each of said paths, and means connecting said voltage pulse to the input of the oscilloscope to synchronize its sweep circuit with the discharge of said identical discharge capacitors.

2. A testing device according to claim 1, wherein the voltage supply to said trigger circuit is 180° out of phase with respect to the voltage supply to the rectifier, whereby the discharge capacitors cannot discharge through the discharge tubes while the rectifier is conducting, and the 60-cycle supply voltage cannot appear across the windings under test.

3. A testing device according to claim 1, wherein said trigger circuit is provided with a phase shifting circuit to control the exact point in the cycle at which the discharge tubes start conduction.

4. A testing device according to claim 1, wherein said trigger circuit includes an additional electronic tube positioned in the circuit to derive its plate current from the first electronic tube in said trigger circuit so that it cannot fire until said first tube has fired, means to delay the firing of the additional tube for about 0.5 microsecond, said additional tube, when it fires, providing a short circuit to ground to terminate the voltage pulse produced by the firing of said first tube.

5. A testing device according to claim 1, wherein said device is enclosed in a case having a cover, a microswitch associated with said cover, a relay arranged to be energized by said microswitch when said door is closed and contacts in the discharge paths to both said windings, said relay, when deenergized, disconnecting said contacts.

6. A testing device according to claim 1, wherein said device is enclosed in a case having a cover, a microswitch associated with said cover, a relay arranged to be energized by said microswitch when said door is closed and contacts in the discharge paths to both said windings, said relay, when deenergized, disconnecting said contacts, and short circuiting said trigger circuit, said relay, when energized, opening said short circuit.

7. A testing device according to claim 1, wherein a short circuit is provided for said trigger circuit, and manual means are provided to open and close said short circuit.

8. A testing device according to claim 1, wherein the trigger circuit comprises two series connected resistors in series with a gas thyratron, the voltage rise in one of said resistors resulting from ionization of said gas thyratron constituting a first pulse, and the voltage rise across both of said resistors resulting from ionization of said gas thyratron constituting a second pulse, the said first pulse being applied to said oscilloscope to initiate the sweep thereof, and the said second pulse being applied to said discharge tubes to fire them, the values of said resistors and the gain of said oscilloscope being chosen so that the oscilloscope sweep commences before said thyratrons fire.

9. A testing device according to claim 8, wherein of the value of the resistance of said first resistor, the value of the resistance of said second resistor, and the value of the gain of said oscilloscope, at least two of said values are adjustable.

10. A testing device according to claim 1, wherein the trigger pulse is coupled to the control grids of the various discharge tubes by means of a resistance-capacity coupling and a source of D.C. potential, so as to control the firing of said discharge tubes without disturbing their ability to maintain the required forward voltage across their terminals previous to firing, and without causing the trigger voltage itself to appear across the two windings nor to affect appreciably the null reading of the oscilloscope.

References Cited in the file of this patent

UNITED STATES PATENTS

| | | |
|---|---|---|
| 2,321,424 | Rohats | June 8, 1943 |
| 2,584,680 | Doncyson | Feb. 5, 1952 |

OTHER REFERENCES

Race: General Electric Review, August 1941, pages 445–450.

Rohats et al.: General Electric Review, September 1951, pages 51–55.